(12) United States Patent
Stork et al.

(10) Patent No.: US 6,212,296 B1
(45) Date of Patent: Apr. 3, 2001

(54) METHOD AND APPARATUS FOR TRANSFORMING SENSOR SIGNALS INTO GRAPHICAL IMAGES

(75) Inventors: David G. Stork, Portola Valley; Michael Angelo, Redwood City; Gregory J. Wolff, Mountain View, all of CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 08/996,537

(22) Filed: Dec. 23, 1997

(51) Int. Cl.[7] .............................. G06K 9/00; G09G 5/00
(52) U.S. Cl. ..................... 382/188; 345/169; 345/179; 178/19.01
(58) Field of Search ........................ 382/119, 120, 382/121, 122, 123, 188, 187; 345/179, 169; 178/19.01, 19.03, 19.04, 19.05

(56) References Cited

U.S. PATENT DOCUMENTS

| | | | |
|---|---|---|---|
| 4,070,649 | * 1/1978 | Wright et al. | 382/188 |
| 4,128,829 | * 12/1978 | Herbst et al. | 382/120 |
| 4,613,866 | * 9/1986 | Blood | 343/448 |
| 5,781,661 | * 7/1998 | Hiraiwa et al. | 382/188 |
| 5,828,197 | * 10/1998 | Martin et al. | 318/567 |
| 5,881,312 | 3/1999 | Dulong | 382/181 |
| 5,902,968 | * 5/1999 | Sato et al. | 178/19.01 |

OTHER PUBLICATIONS

Herbst et al Signature Verification Based on Complete Accelerometry, IBM TDS vol. 19, May 1977, pp. 4827 and 4828.*

* cited by examiner

Primary Examiner—Bhavesh Mehta
(74) Attorney, Agent, or Firm—Blakely, Sokoloff, Taylor & Zafman LLP

(57) ABSTRACT

A method and apparatus to precisely track the position of the writing instrument, specifically the writing end, such as the tip, of a pen. One embodiment of the invention described herein includes a writing instrument containing acceleration sensors and angular velocity sensors. Data from these sensors are processed via an Euler transform to determine the strokes made with the writing instrument. Corrections may be made to improve upon the output of the Euler transform. The data describing the strokes may include graphical representations of the strokes actually made with the writing instrument. Data describing the strokes may be stored or processed to accomplish a variety of tasks such as recording information, faxing a message, recording an appointment, or other such tasks.

18 Claims, 5 Drawing Sheets

METHOD AND APPARATUS FOR TRANSFORMING SENSOR SIGNALS INTO GRAPHICAL IMAGES

FIELD OF THE INVENTION

The present invention relates to tracking the location of a writing instrument, and more specifically, to transforming the movements of a writing instrument to graphical image of stokes made with the writing instrument.

BACKGROUND OF THE INVENTION

In the prior art, a number of input devices exist that allow a user to provide input to a computer or other device. Typically, these input devices (i.e., a mouse, a touch sensitive screen) are physically connected to the device to which input is provided. These devices do not allow a user to simply write the input as he or she would with a writing instrument such as a pen or a pencil. For some activities, such as sending a facsimile (faxing) or making an entry in an appointment book, it would be simpler for a user to write out a message or entry as he or she would with an ordinary pen or pencil that is not physically connected to a computer rather than use prior art input devices to create a message for faxing or to enter an appointment.

In order to provide a writing instrument as an input device, a system for tracking the position of the writing instrument and transforming characters made with the writing instrument to input characters must be provided. The better the tracking system, the more accurately the user input is received. Therefore, it is desirable to provide a tracking system that tracks the position of the writing instrument and transforms the movements of the writing instrument into graphical images that may be used as input to a computer or other device.

SUMMARY OF THE INVENTION

A method and apparatus for generating a graphical image of strokes made by a writing instrument is described. In one embodiment, a writing instrument is monitored via a plurality of sensors, a Euler transform is performed on data from the sensors to generate transformed data, and the transformed data is mapped to a graphical image of strokes made with the writing instrument.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
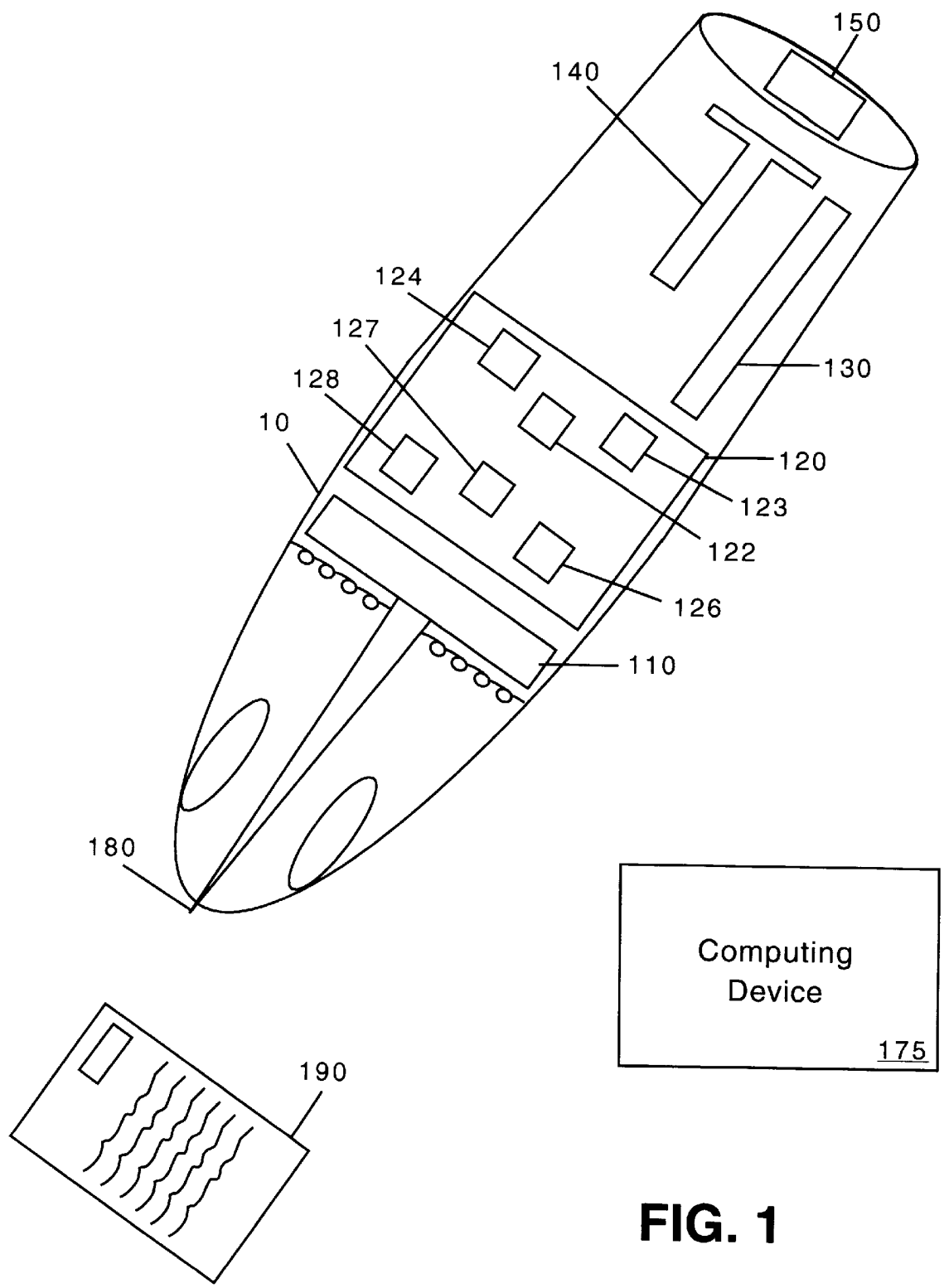
FIG. 1 is one embodiment of a writing instrument according to the present invention.

A method and apparatus for transforming strokes made with a writing instrument into a graphical image is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid obscuring the present invention.

The present invention allows a user of a writing instrument to have the strokes he/she makes recorded in a graphical format, such as a bitmap. Such a device may be useful in a variety of applications. For example, a user may make an entry in an appointment book or other time management book. The strokes used to make that entry may be recorded in an electronic appointment schedule or a central group schedule. Such a device is disclosed in a U.S. patent application entitled "MANUAL ENTRY INTERACTIVE PAPER AND ELECTRONIC DOCUMENT HANDLING AND PROCESSING SYSTEM" filed Nov. 1, 1995, application Ser. No. 08/551,535, assigned to the corporate assignee of the present invention.

Alternatively, a user may write a message on a piece of paper and have the message faxed or electronically mailed to a recipient. Thus, the user would not have to locate and/or operate a fax machine or computer terminal to send the message to the recipient. A pen-based faxing device is disclosed in a U.S. patent application entitled "METHOD AND APPARATUS FOR PEN-BASED FAXING," filed Sep. 30, 1997, application Ser. No. 08/940,832 assigned to the corporate assignee of the present invention.

In addition to writing instruments, the method and apparatus disclosed herein may also be used with pointing devices such as a wireless cursor control device. A wireless cursor control device is more fully disclosed in a U.S. patent application entitled "DIRECT POINTING APPARATUS FOR DIGITAL DISPLAYS", application Ser. No. 08/840,552, filed on Apr. 18, 1997, assigned to the corporate assignee of the present invention.

In order to provide the devices described above, a method and apparatus is provided to track the writing instrument, specifically the writing end, such as the tip of a pen. One embodiment of the invention described herein comprises a writing instrument containing three acceleration sensors (accelerometers) and three angular velocity sensors (gyroscopes). The sensors output voltage levels are sampled and processed via an Euler transform to describe the strokes made with the writing instrument. Correction methods to improve upon the output of the Euler transform output are also disclosed.

The data describing the strokes may be stored or processed to accomplish a variety of tasks including those discussed above, such as faxing a message, recording an appointment, or other such tasks. The stroke data comprises graphical representations of the strokes actually made with the writing instrument rather than stored characters or templates as with an optical character recognition (OCR) device.

The Writing Instrument

One embodiment of a writing instrument having multiple sensors according to the present invention is briefly described. It should be noted, however, that the writing instrument is not required to make a physical mark of any kind. The present invention may be used with normal paper (not a tablet). In other words, no special pad is required. Any device that allows a user to make writing motions that are to be tracked may be used. Additionally, because the actual strokes that the user makes are tracked and processed, the quality of the user's handwriting is not important.

FIG. 1 is one embodiment of writing instrument 10 whose position may be tracked according to the present invention. The lower portion of writing instrument 10 generally comprises ink supply 110, and pen tip 180. As noted above, writing instrument 10 is not required to actually mark a surface such as writing surface 190. Thus, ink supply 110 is only included when a pen-type writing instrument is required or discussed. Writing surface 190 may be a plain piece of paper, a specially formatted document, or any other type of writing surface.

In one embodiment, the upper portion of writing instrument 10 comprises tracking sensors 120, battery 130, transceiver 140 and a light emitting diode (LED) or liquid crystal display (LCD) 150. In one embodiment, tracking sensors 120 comprise three accelerometers (122, 123 and 124) and three gyroscopes (126, 127 and 128); however, the number and type of sensors may be varied depending on the accuracy desired and the environment in which writing instrument 10 is used. In one embodiment, tracking sensors 120 provide movement and acceleration in three directions (i.e., x, y and z) with respect to the fixed frame of the position tracking system.

Pen tip 180 and accelerometers 122, 123 and 124 are used to determine when the writing instrument is touching writing surface 190. In such an embodiment, only the strokes made when pen tip 180 is touching writing surface 190 are processed. Of course, other embodiments are also possible, such as allowing a user to write in the air, with indications of which strokes are to be processed provided in another way, such as the user pressing a button or activating a switch either on or off writing instrument 10.

Battery 130 provides power to tracking sensors 120, transmitter/receiver 140, display 150 and any other components of writing instrument 10 that may require power. Transceiver 140 transmits data from tracking sensors 120 and other data to remote computing device 175. Transceiver 140 may also receive data from remote computing device 175. LED/LCD 150 provides feedback to the user. Remote computing device 175 may be a personal computer, a fax machine, or other computing device.

To use writing instrument 10, a user writes a message on writing surface 190. Pen tip 180 and ink supply 110 allow the user to write a message as he or she normally would write on a piece of paper. As noted above, recording the message on writing surface 190 is not necessary; however, doing so provides the user with a copy of the message written for his or her records.

As the user writes out a message, tracking sensors 120 monitor the strokes made to record the message written in the form of a series of strokes. Data from tracking sensors 120 are transmitted to remote computing device 175 via transceiver 140. Alternatively, the data from tracking sensors 120 may be processed and stored in writing instrument 10.

When a stroke is being made with writing instrument 10, tracking data from tracking sensors 120 are recorded and processed. In one embodiment, the stroke data output by the tracking sensors 120 are voltages. For accelerometers 122, 123 and 124, the voltages output are proportional to the accelerations measured in each of three directions (i.e., x, y and z) with respect to the moving frame of writing instrument 10. When writing instrument 10 is at rest these accelerations consist of the force of gravity ($-9.81$ m/sec$^2$). For gyroscopes 126, 127 and 128, the voltages output are proportional to the angular velocity of writing instrument 10 in each of three directions (i.e., x, y and z) with respect to the moving frame of writing instrument 10.

Voltage levels generated by the sensors (both accelerometers and gyroscopes) is transmitted to remote computing device 175 which maps the data to positions of writing instrument 10. Transmission of the voltage levels may be accomplished, for example, by sampling the sensor output voltage levels with an analog-to-digital converter and sending the digital information to computing device 175 via transceiver 140. Computing device 175 receives the digital information representing voltage levels output by the sensors and determines the position of writing instrument 10.

Prior to writing a message with writing instrument 10, calibration of the tracking system is performed by placing writing instrument 10 in known positions taking sensor readings. The sensor readings obtained at the known positions are used to define the known positions. Computing device 175 maps other sensor outputs to writing instrument positions by interpolation based on the sensor outputs at the predetermined positions. Interpolation is performed by a polynomial approximation or other transform. Calibration of the tracking system is described in more detail below.

After calibration, voltage level information received by computing device 175 is mapped to positions of writing instrument 10. By determining the position of writing instrument 10, computing device 175 determines strokes made with writing instrument 10. Graphical representations of strokes are generated and output as a graphical display, a fax message, or for another purpose.

Alternative implementations of a position sensor system described as used in a writing instrument is disclosed are a patent application entitled "MANUAL ENTRY INTERACTIVE PAPER AND ELECTRONIC DOCUMENT HANDLING AND PROCESSING SYSTEM" filed Nov. 1, 1995, application No. 08/551,535, assigned to the corporate assignee of the present invention.

Basic Position Tracking

Figure 2:
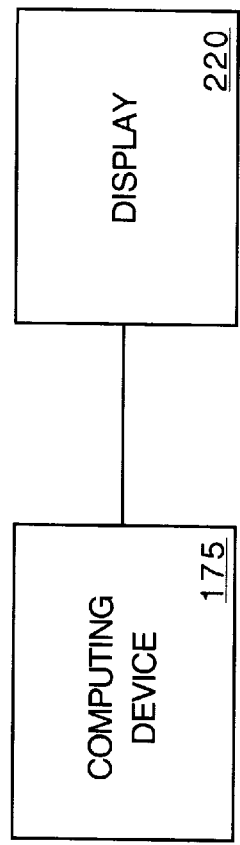
FIG. 2 is a block diagram of one embodiment of a writing instrument tracking system with a display output.
Figure 2:
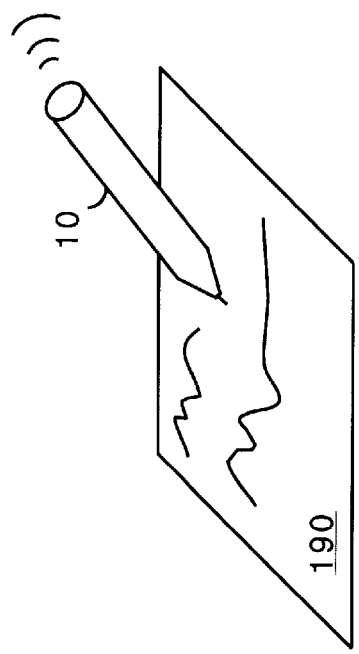

FIG. 2 is a block diagram of one embodiment of a writing instrument tracking system with a display output. Writing instrument 10 is used to write a message or other input on writing surface 190. In one embodiment, data from the sensors in writing instrument 10 are transmitted to computing device 175. Computing device 175 processes the data received from writing instrument 10 to generate graphical images of strokes made with writing instrument 10. The graphical images, may be, for example, bitmaps or other graphical representations of the strokes made with writing instrument 10. The graphical images are displayed on display 220. Alternatively, the graphical images may be communicated to another device, such as a fax machine.

In one embodiment, tracking of the position of writing instrument 10 is accomplished via an Euler transform. Generally, the Euler transform provides for transforming the output of tracking sensors 120 into data that defines strokes made by the user with writing instrument 10. The Euler transform is a series of three frame rotations, starting with a $\psi$ radian rotation about the z-axis of a global (fixed) frame to produce frame 1. Then frame 1 is rotated $\theta$ radians about the y-axis of frame 1 to produce frame 2. Frame 2 is rotated $\phi$ radians about the x-axis of frame 2 to reach the writing instrument frame. In one embodiment, frame rotations are performed as described above; however, frame rotations may be performed in a different order depending, for instance, on which frame is desired to have the greatest accuracy.

It is important to note that interpreting $\theta$ as the angle between the y-axis of the global frame and the y-axis of the writing instrument frame is incorrect. Properly interpreted, $\theta$ is the angle between the y-axis of the global frame after it has been rotated about its z-axis (frame 1) and the y-axis of the writing instrument frame before it has been rotated about its x-axis (frame 2).

A Euler transform is used to transform acceleration and angular velocity data into position data based on accelerations and velocities from a known location. The Euler transform is commonly used in the fields of aerial and naval navigation. When used for navigation, however, the Euler transform is not calculated with the precision that is required for tracking of a writing instrument.

In order to recreate strokes made with writing instrument 10 from data provided by the Euler transform, accelerations are integrated twice by computing device 175 to determine distance relative to a starting position. Integrations, as well as computations described below, may be accomplished in hardware and/or software. Alternatively, the computations may be performed by hardware and/or software in writing instrument 10. Gyroscopes 126, 127 and 128 in writing instrument 10 provide outputs that are used to correct for accelerations induced by angular rotations of writing instrument 10 as writing instrument 10 is moved.

To convert accelerations in the writing instrument frame, $$[\ddot{x}_w, \ddot{y}_w, \ddot{z}_w],$$

into accelerations in the global frame, $$[\ddot{x}_g, \ddot{y}_g, \ddot{z}_g],$$

the following (Euler) transform is used:

$$\begin{bmatrix} \ddot{x}_g \\ \ddot{y}_g \\ \ddot{z}_g \end{bmatrix} = \begin{pmatrix} \cos\theta\cos\psi & \sin\phi\sin\theta\cos\psi - \cos\phi\sin\psi & \cos\phi\sin\theta\cos\psi + \sin\phi\sin\psi \\ \cos\theta\sin\psi & \sin\phi\sin\theta\sin\psi + \cos\phi\cos\psi & \cos\phi\sin\theta\sin\psi - \sin\phi\cos\psi \\ -\sin\theta & \sin\phi\cos\theta & \cos\phi\cos\theta \end{pmatrix} \begin{bmatrix} \ddot{x}_w \\ \ddot{y}_w \\ \ddot{z}_w \end{bmatrix} \quad \text{Equation 1}$$

or $$\begin{bmatrix} \ddot{x}_g \\ \ddot{y}_g \\ \ddot{z}_g \end{bmatrix} = E^{-1} \begin{bmatrix} \ddot{x}_w \\ \ddot{y}_w \\ \ddot{z}_w \end{bmatrix}. \quad \text{Equation 2}$$

The dependence of the angles and sensor signals on time has been omitted to simplify the notation. The writing instrument frame is continuously moving, and sensor outputs are mapped into a global frame. Sensor outputs are mapped at each time step. Time steps are chosen according to the resolution desired, for example, 0.25 seconds.

The foregoing transformation is accurate assuming that the accelerometers are located in the tip of the writing instrument. However, in one embodiment, the accelerometers are located in the upper portion of writing instrument 10. A correction is made to account for the three-dimensional displacement of each of the accelerometers from the tip of writing instrument 10. Assuming three accelerometers, these displacements are described as:

$$[OX_x, OX_y, OX_z]$$

for three-dimensional displacement of the x-axis accelerometer, $$[OY_x, OY_y, OY_z]$$

for three-dimensional displacement of the y-axis accelerometer, and $$[OZ_x, OZ_y, OZ_z]$$

for three-dimensional displacement of the z-axis accelerometer. These displacements may differ depending of the placement of each accelerometer in the writing instrument. Taking into consideration the three-dimensional displacement of the accelerometers, the Euler transform becomes:

$$\begin{bmatrix} \ddot{x}_g \\ \ddot{y}_g \\ \ddot{z}_g \end{bmatrix} = E^{-1} \begin{bmatrix} \ddot{x}_w \\ \ddot{y}_w \\ \ddot{z}_w \end{bmatrix} - \begin{pmatrix} m_{11}OX_x & m_{12}OX_y & m_{13}OX_z \\ m_{21}OY_x & m_{22}OY_y & m_{23}OY_z \\ m_{31}OZ_x & m_{32}OZ_y & m_{33}OZ_z \end{pmatrix} \begin{pmatrix} 0 \\ 0 \\ g \end{pmatrix}. \quad \text{Equation 3}$$

In the foregoing equations, $$M = \begin{pmatrix} m_{11} & m_{12} & m_{13} \\ m_{21} & m_{22} & m_{23} \\ m_{13} & m_{23} & m_{33} \end{pmatrix} = E\dot{E}^{-1} \quad \text{Equation 4}$$

and $\phi_0$, $\theta_0$ and $\psi_0$ are determined from the following equations:

$$\phi_0 = \arctan\frac{\overline{\ddot{y}}_w}{\overline{\ddot{z}}_w}, \quad \text{Equation 5}$$

$$\theta_0 = \arctan\frac{\overline{\ddot{x}}_w}{\sqrt{\overline{\ddot{y}}_w + \overline{\ddot{z}}_w}} \quad \text{Equation 6}$$

and $$\psi_0 = 0.$$

In Equations 4–6, $\overline{\ddot{x}}_w$, $\overline{\ddot{y}}_w$ and $\overline{\ddot{z}}_w$ are the average x-axis, y-axis and z-axis accelerometer readings for a motionless writing instrument. For a motionless writing instrument, the sum of the x-axis, y-axis and z-axis accelerometer readings is approximately equal to the force of gravity ($-9.81$ m/s$^2$), which varies slightly depending on altitude.

The equations above for determining $\phi_0$, $\theta_0$ and $\psi_0$ assume a perfectly vertical writing instrument. In this case, the z-axis accelerometer readings will be equal to gravity ($-9.81$ m/s$^2$) and the x-axis and y-axis accelerometers read 0 m/s$^2$. Any rotation about the z-axis will result in the same accelerometer readings. Of course, adjustments may be made for deviations from a perfectly vertical initial position, such as for an angled writing surface.

Assuming that P, Q and R are the gyroscope outputs around the x, y and z axes, respectively, $\phi$, $\theta$ and $\psi$ are updated as follows:

$$\dot{\phi}_t = P_t + Q_t\sin\phi_t\tan\theta_t + R_t\cos\phi_t\tan\theta_t, \quad \text{Equation 7}$$

$\dot{\theta}_t = Q_t\cos\phi_t - R_t\sin\phi_t$, and  Equation 8

$\dot{\psi}_t = Q_t\sin\phi_t\sec\theta_t + R_t\cos\phi_t\sec\theta_t$.  Equation 9

For the discrete case, where $\Delta t$ is the sampling interval, $\phi, \theta$ and $\psi$ are updated as follows:

$\phi_t = \phi_{t-1} + \Delta t\dot{\phi}_{t-1}$,  Equation 10

$\theta_t = \theta_{t-1} + \Delta t\dot{\theta}_{t-1}$, and  Equation 11

$\psi_t = \psi_{t-1} + \Delta t\dot{\psi}_{t-1}$.  Equation 12

Position data are obtained by integrating the accelerations twice as follows:

$$x_g(t) = \sum_{i=1}^{t}\sum_{j=1}^{i}\ddot{x}_g(j)\Delta t\Delta t,$$  Equation 13

$$y_g(t) = \sum_{i=1}^{t}\sum_{j=1}^{i}\ddot{y}_g(j)\Delta t\Delta t, \text{ and}$$  Equation 14

$$z_g(t) = \sum_{i=1}^{t}\sum_{j=1}^{i}\ddot{z}_g(j)\Delta t\Delta t.$$  Equation 15

The foregoing discussion assumes no corrections being made to the output of the Euler transform. However, because of the small motions used to write alpha-numeric characters and noise in the writing instrument and tracking system may cause some strokes output by the system to be different from the strokes written by the user, which may result in unreadable characters. Therefore, in certain embodiments of the present invention, additional processing not discussed above with respect to the Euler transform is also performed. The additional processing improves the accuracy of the graphical images displayed in representing strokes made with the writing instrument. Of course, more than one of the corrections discussed below may be used together in a single embodiment.

Corrections to Euler Transform Outputs

In one embodiment, the tracking system of the present invention provides corrections to the position data generated by a Euler transform. When corrections are provided, data output from the Euler transform is adjusted so that outputs more accurately represent the characters written with the writing instrument. The user writes a message with writing instrument 10 on writing surface 190. Sensor outputs are processed by computing device 175 via an Euler transform as well as one or more of the corrections discussed below. The output may be displayed on display 220. Alternatively, the output may be faxed or otherwise communicated to a remote user or device.

Probability Tables

One correction to the Euler transform output is to use a probability table to improve the accuracy of the image representing strokes made with writing instrument 10. A template for each character that may be written, or a subset of possible characters (e.g., most common characters, characters that are most likely to be confused with other characters) is stored. When a character is written by the user that character is compared with the characters in the table. If the probability of a match is above a certain threshold, adjustments are made to the Euler parameters. If multiple characters have probabilities above the threshold, the character with the highest probability is selected.

Figure 3:
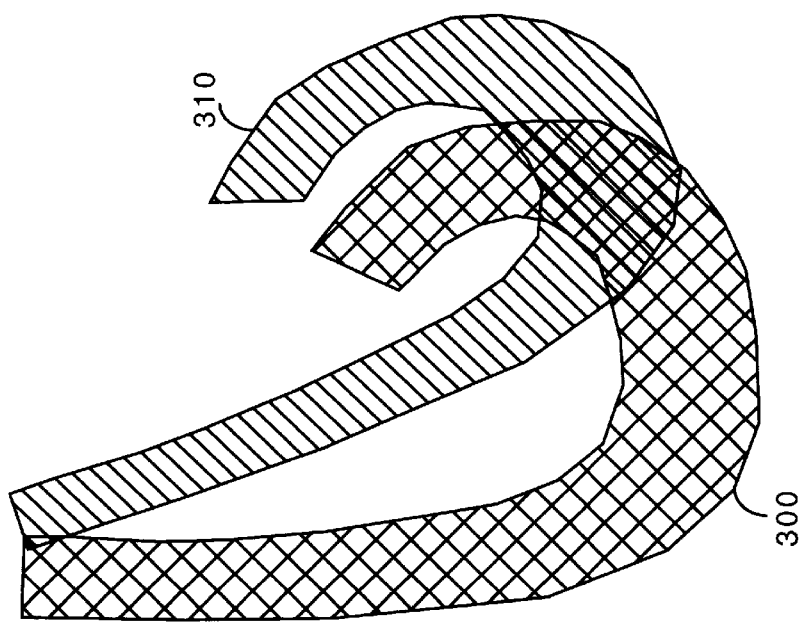
FIG. 3 is a possible character made by a user and one embodiment of a probability table for providing correction to the Euler transform output.

FIG. 3 is a possible character made by a user and one embodiment of a probability table for providing correction to the Euler transform output. It is important to note that probability tables do not provide OCR because the template from the probability table does not replace the character written with the writing instrument. Instead, probability tables provide a statistical method for correcting the parameters of the Euler transform to more accurately reproduce the characters written by the user. For example, multipliers may be used for horizontal or vertical portions of characters so that the character may be taller or wider, or shifted horizontally or vertically to be a more accurate representation of the character written by the user. For simpler corrections, such as horizontal and/or vertical shifts, the corrections may be made to the output of the Euler transform. For more complex corrections, multipliers may be applied to one or more terms of the Euler transform.

Input character 300 is the character actually written by the user with writing instrument 10. In this case the character is a "6". Output character 310 is the output of the tracking system using only an Euler transform to track writing instrument 10. Output character 310 resembles a "6", but it may also an incomplete "0" or other character.

Probability table 320 contains the probabilities that output character 310 was intended to be one of the characters for which a template is stored. For simplicity, only the numbers 0 through 9 are shown; however, any number or combination of templates may be used.

Probability table 320 stores a probability for each template that a particular input character 300 was intended to be the character corresponding to that template. In one embodiment, the probabilities are determined by a squared (Manhattan) distance fit. Of course, the probabilities may be determined in other ways. For some characters, the probability that input character 300 was intended to be that character will be low enough that those particular intended characters may be disregarded. In the example in FIG. 3, the templates for "2" and "5" are such characters. In other words, the probability that input character 300 was intended to be that character must be above a predetermined base threshold. In one embodiment, a template with a probability below 0.50 is disregarded. The actual probability threshold will depend upon the task at hand, the number of candidate categories and the user's tolerance for occasional distortions in characters.

From the templates with probabilities above the threshold, the template with the highest probability is chosen. The form of the character represented by the template chosen is used to modify the Euler transform parameters so that output character 310 and subsequent output characters more closely resemble input character 300 and subsequent input characters, respectively. If no template probability exceeds the threshold, output character 310 is used and no correction is applied to the output of the Euler transform.

The modification of the Euler transform parameters may be an offset correction, for example. It may be determined that the y-axis outputs are too high with respect to the other sensor outputs. In that case, an offset may be subtracted from the y-axis outputs to give a more accurate output character. Also, corrections may be made based on the square of the distance between the template and the output pattern. Of course, other corrections may also be used, such as angle corrections or rotational corrections.

Basic Offset Correction

A simpler output correction may be provided by having the user trace a predefined pattern with the writing instrument periodically. For example, the user may trace a calibration box and the received sensor outputs compared to the known dimensions of the box to determine a standard correction that is applied to the Euler transform output.

Figure 4:
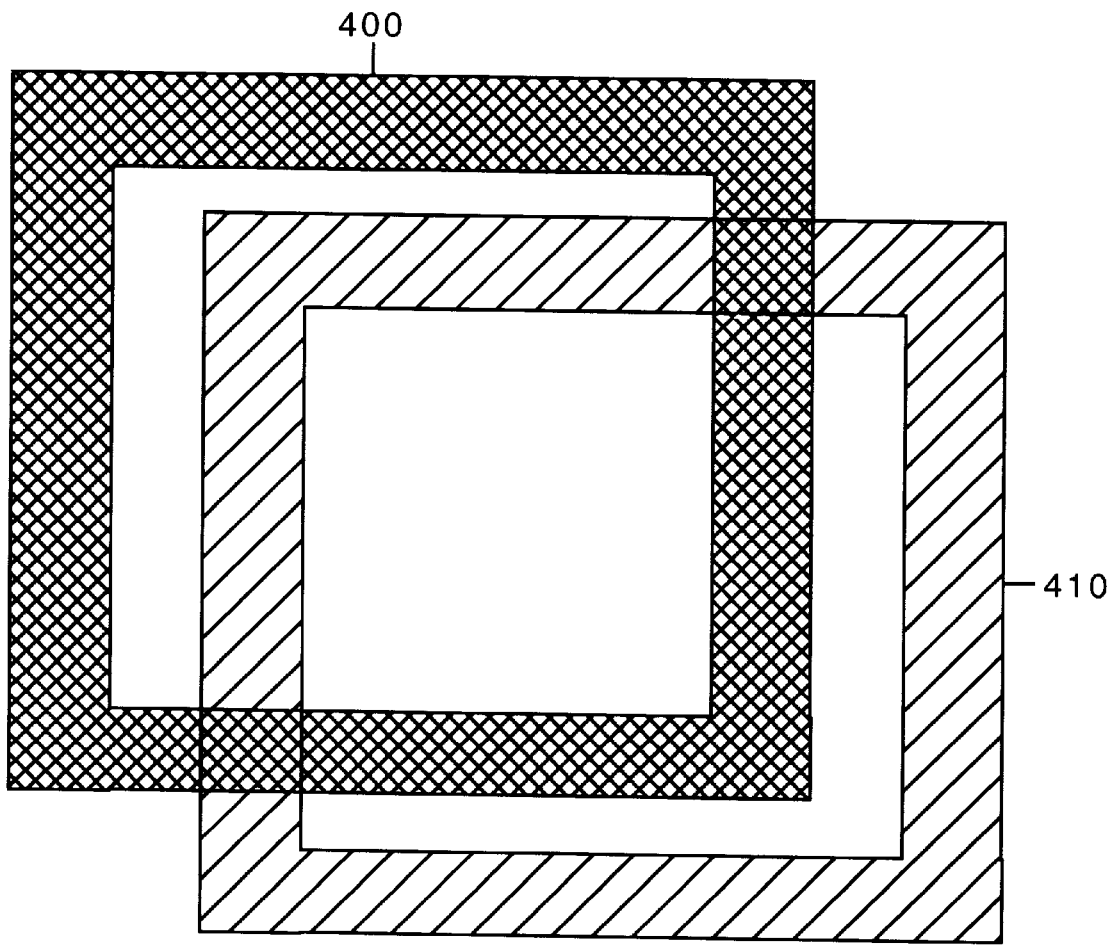
FIG. 4 is one embodiment a calibration box and resulting output used to determine correction factors.

FIG. 4 is one embodiment a calibration box and resulting output used to determine correction factors. Calibration box 400 is a box of known size and shape. Calibration box 400 is not required to be a box, any figure of a predetermined size and shape may be used. Calibration box 400 may be provided on a piece of paper or other surface. Calibration box 400 may also be part of a storage container for writing instrument 10.

Output box 410 is the output from the writing instrument tracking system. By comparing output box 410 to the known dimensions of calibration box 400, offset corrections to be applied to subsequent outputs may be determined. While the basic offset correction described with respect to FIG. 4 is not as effective as the probability tables discussed above with respect to FIG. 3, basic offset correction provides an improvement on basic Euler transform tracking.

Figure 5:
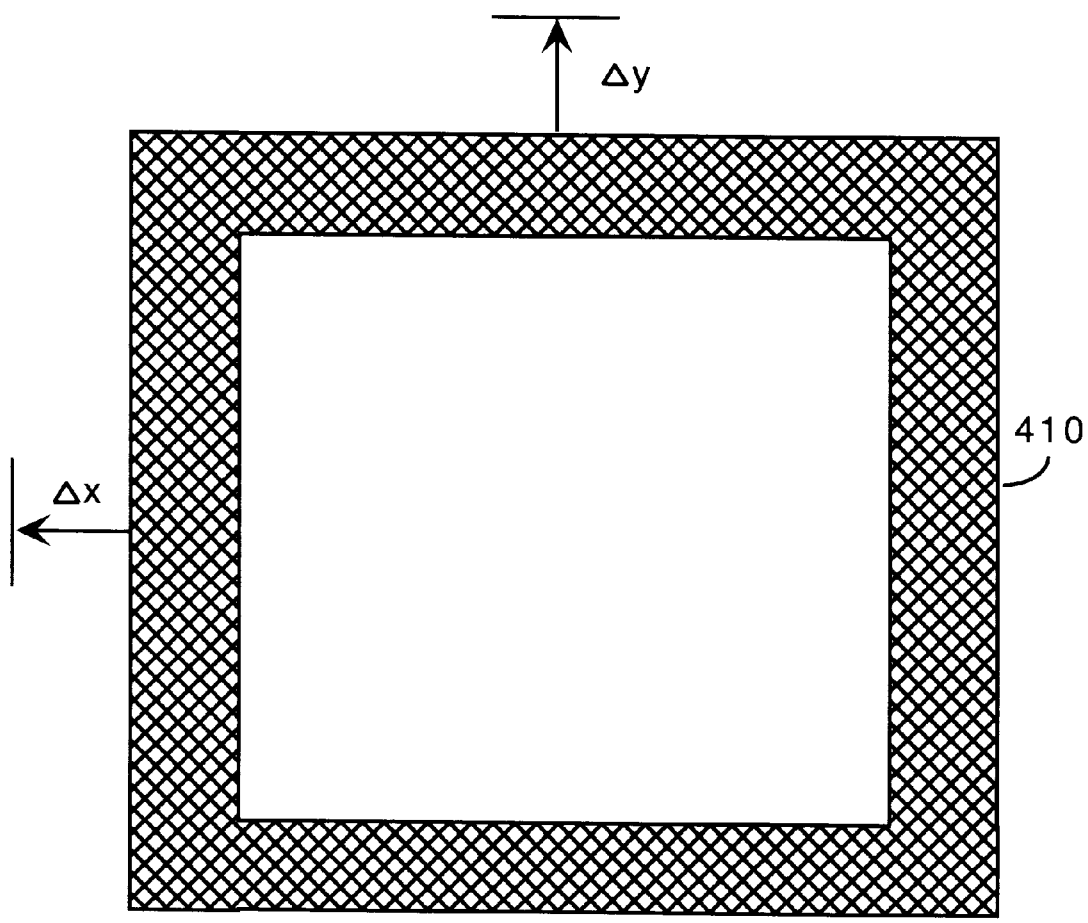
FIG. 5 is one embodiment of the output of FIG. 4 having correction factors applied.

FIG. 5 is output box 410 of FIG. 4 having correction factors applied. In one embodiment, correction factors are offsets in the x direction (i.e., horizontally) and in the y direction (i.e., vertically). The correction factors are applied to all stroke data so that output strokes are displaced by constant amount vertically and/or horizontally. While offsets may be provided in both the horizontal and vertical direction, the offsets are not necessarily the same size.

In FIG. 5, output box 410 has a vertical offset, $\Delta y$, so that the horizontal top and bottom lines of output box 410 are aligned with the horizontal top and bottom lines of calibration box 400 (not shown in FIG. 5). Similarly, output box 410 has a horizontal offset, $\Delta x$, so that the vertical side lines of output box 410 are aligned with the vertical side lines of calibration box 400.

Pattern Prediction

The writing instrument tracking system may also "learn" the writing style of the user. By learning how a user makes strokes or writes particular characters, the system may be able to predict where the pen tip should be. Correction to the generated output can then be made to more accurately recreate the strokes made by the user.

When implementing pattern prediction, the system analyzes a period of previous writing, for example, a tenth of a second or a half of a second. By analyzing where the writing instrument has been in the recent past, the system is better able to determine where the writing instrument is presently and where it will be in the future. Corrections based on these predictions are used to modify the parameters of the Euler transform. For example, the writing instrument tracking system may learn that a user makes the character "p" by starting at the bottom of the character and completing the character in a single stroke without lifting the writing instrument so that the stroke resembles the character "p". The writing instrument tracking system may use this information to make the output character more closely resemble the character "p" than would happen otherwise.

Statistical Corrections

Because in English, or any other language, only a certain subset of all possible characters may follow a particular character, subsequent characters may be compared to the appropriate subset of characters. Thus, statistical analysis may be used to implement a correction to the output of the Euler transform.

Statistical corrections may be may also provided by analyzing stroke sequences. As with characters discussed above, only certain strokes follow particular strokes to make alpha-numeric characters. For example, if a first stroke in a character is a vertical line, only one of the subset of characters that contains a vertical line is intended. Therefore, the tracking system may anticipate one of the strokes that is included in the subset of characters containing a vertical line. Corrections may be made based on a comparison of the subsequent stroke to the set of anticipated strokes.

Statistical analysis may be used, for example, in conjunction with the probability tables discussed above. The templates to which in input or output character is compared may be chosen based on the probability that each particular character will follow the most recently written character.

Hidden Markov Modeling

Hidden Markov Modeling may also be used to provide correction to the output of the Euler transform. Hidden Markov Modeling is well known for use with pattern recognition.

Neural Networks

Neural networks may be used to learn the writing style or technique of the user. Information determined by the neural network may be used to provide a correction to the output of the Euler transform. In order for the neural network to distinguish between users if a writing instrument has multiple users, the writing instrument may have an identification device, such as a button or switch to identify the user to the writing instrument. Alternatively, the a user may write his or her name or identification code so that the system may adapt to the appropriate user.

One or more of the foregoing corrections may be applied to the basic tracking provided by the Euler transform. These improvements, as well as the Euler transform, may be implemented in hardware or in software.

Sensor Calibration

Because the writing instrument may be used in many different environments that can affect sensor output, such as temperature variations, altitude variations, etc., one embodiment of the present invention includes sensor calibration. Sensor calibration may be accomplished by putting the sensors in a known orientation with known acceleration components, and then using a polynomial fit of the (voltage, acceleration) pairs. For example, when one of the accelerometers, such as the x-axis accelerometer, is perpendicular to gravity, then the output of that accelerometer should correspond to $-9.81$ m/sec$^2$ and the other two accelerometers should read 0 m/sec$^2$. Then the writing instrument is rotated 90 degrees, and the x-axis accelerometer should read 0 m/sec$^2$.

The two points obtained ($v_1$, $-9.81$) and ($v_2$, 0) can then be fit to a line so that new voltages can be interpolated into accelerations. If a higher order fit is desired, more readings may be taken. Additionally, adjustments may be made for slope of the writing surface. Calibration of the writing instrument is more fully described in a U.S. patent application entitled "CALIBRATION OF A SYSTEM FOR TRACKING A WRITING INSTRUMENT WITH MULTIPLE SENSORS", Application Ser. No. 08/999,010,filed Dec.27,1997. assigned to the corporate assignee of the present invention.

Sensor calibration provides a further improvement upon the basic tracking provided by the Euler transform. Any of the tracking, correction, or calibration methods described herein may be used alone or in combination to achieve the tracking accuracy desired.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for generating a graphical image of strokes made by a writing instrument, the method comprising:
   obtaining data indications of strokes, via a plurality of sensors, made with the writing instrument;
   performing a transform on data from the sensors to generate transformed data;
   adjusting the transformed data by:
      determining a probability that a character made with the writing instrument corresponds each of a first plurality of character templates in a probability table;
      selecting a second plurality of character templates, wherein the second plurality of character templates is a subset of the first plurality of character templates;
      selecting one character template of the second plurality of templates with a highest probability of corresponding to the character made with the writing instrument;
      adjusting the transformed data based on a difference between the character made with the writing instrument and the selected template; and mapping the adjusted transformed data to a graphical image of the strokes.

2. A method for generating a graphical image of strokes made by a writing instrument, the method comprising:
   obtaining data indications of strokes, via a plurality of sensors, made with the writing instrument;
   performing a transform on data from the sensors to generate transformed data;
   mapping the transformed data to a graphical image of the strokes; and
   adjusting the transformed data by:
      receiving sensor data corresponding to a tip of the writing instrument being traced over a predetermined pattern;
      comparing the sensor data to a known configuration of the predetermined pattern; and
      adjusting the transformed data based on a difference between the sensor data and the known configuration.

3. A method for generating a graphical image of strokes made by a writing instrument, the method comprising:
   obtaining data indications of strokes, via a plurality of sensors, made with the writing instrument;
   performing a transform on data from the sensors to generate transformed data;
   mapping the transformed data to a graphical image of the strokes; and
   adjusting the transformed data by performing pattern recognition on the transformed data; and adjusting the transformed data based on results of the pattern recognition such that a graphical representation of the strokes more closely represents a character written with the writing instrument.

4. The method of claim 3, wherein performing pattern recognition further comprises use of Hidden Markov Modeling.

5. The method of claim 3, wherein performing pattern recognition further comprises use of a neural network.

6. A method for generating a graphical image of strokes made by a writing instrument, the method comprising:
   obtaining data indications of strokes, via a plurality of sensors, made with the writing instrument;
   performing a transform on data from the sensors to generate transformed data;
   mapping the transformed data to a graphical image of the strokes; and
   adjusting the transformed data by performing a statistical analysis on the transformed data; and adjusting the transformed data based on results of the statistical analysis such that a graphical representation of the strokes more closely represents a character written with the writing instrument.

7. The method of claim 6, wherein performing statistical analysis further comprises:
   analyzing a previous stroke made with the writing instrument;
   determining a set of possible subsequent strokes;
   comparing an actual subsequent stroke to the set of possible subsequent strokes;
   determining one of the set of possible subsequent strokes that corresponds to the actual subsequent stroke; and
   adjusting the transformed data based on a difference between the actual subsequent stroke and the corresponding possible subsequent stroke.

8. The method of claim 6, wherein performing statistical analysis further comprises:
   analyzing a previous character made with the writing instrument;
   determining a set of possible subsequent characters;
   comparing an actual subsequent character to the set of possible subsequent characters;
   determining one of the set of possible subsequent characters that corresponds to the actual subsequent character; and
   adjusting the transformed data based on a difference between the actual subsequent character and the corresponding possible subsequent character.

9. The method of claim 6 further comprising: obtaining sensor readings for each of a plurality of predefined positions of the writing instrument; and
   generating a mapping of sensor outputs to writing instrument positions based on the sensor readings at the plurality of predefined positions.

10. A system for mapping strokes made by a writing instrument to a graphical image, the system comprising:
    a writing instrument;
    a plurality of sensors comprising accelerometers and gyroscopes that monitor positions of the writing instrument;
    means for performing a transform on outputs from the plurality sensors to generate transformed data; and
    means for adjusting the transformed data comprising:
    means for providing a probability table having a first plurality of character templates;
    means for determining a probability that a character made with the writing instrument corresponds each of the character templates in a second plurality of character templates, wherein the second plurality of character templates is a subset of the first plurality of character templates;
    means for selecting the character templates with a highest probability;
       means for adjusting the transformed data based on a difference between the character made with the writing instrument and the selected character.

11. A system for mapping strokes made by a writing instrument to a graphical image, the system comprising:
    a writing instrument;

a plurality of sensors comprising accelerometers and gyroscopes that monitor positions of the writing instrument;

means for performing a transform on outputs from the plurality sensors to generate transformed data; and means for adjusting the transformed data comprises:

means for providing a probability table having a first plurality of character templates;

means for determining a probability that a character made with the writing instrument corresponds each of the character templates in a second plurality of character templates, wherein the second plurality of character templates is a subset of the first plurality of character templates;

means for selecting the character templates with a highest probability;

means for adjusting the transformed data based on a difference between the character made with the writing instrument and the selected character.

12. A system for mapping strokes made by a writing instrument to a graphical image, the system comprising:

a writing instrument;

a plurality of sensors comprising accelerometers and gyroscopes that monitor positions of the writing instrument;

means for performing a transform on outputs from the plurality sensors to generate transformed data; and means for adjusting the transformed data comprises:

means for receiving sensor data corresponding to a tip of the writing instrument being traced over a predetermined pattern;

means for comparing the sensor data to a known configuration of the predetermined pattern; and means for adjusting the transformed data based on a difference between the sensor data and the known configuration.

13. A system for mapping strokes made by a writing instrument to a graphical image, the system comprising:

a writing instrument;

a plurality of sensors comprising accelerometers and gyroscopes that monitor positions of the writing instrument;

means for performing a transform on outputs from the plurality sensors to generate transformed data; and means for adjusting the transformed data comprises:

means for preparing pattern recognition on the transformed data; and means for adjusting the transformed data based on results of the pattern recognition.

14. The system of claim 13, wherein the means for performing pattern recognition comprises means for performing Hidden Markov Modeling.

15. The system of claim 13, wherein the means for performing pattern recognition comprises a neural network.

16. The system of claim 13, wherein the means for adjusting the transformed data further comprises:

means for performing a statistical analysis on the transformed data; and means for adjusting the transformed data based on results of the statistical analysis.

17. The system of claim 16, wherein the means for performing statistical analysis further comprises:

means for analyzing a previous stroke made with the writing instrument;

means for determining a set of possible subsequent strokes;

means for comparing an actual subsequent stroke to the set of possible subsequent strokes;

means for determining one of the set of possible subsequent strokes that corresponds to the actual subsequent stroke; and means for adjusting the transformed data based on a difference between the actual subsequent stroke and the corresponding possible subsequent stroke.

18. The system of claim 16, wherein the means for performing statistical analysis further comprises:

means for analyzing a previous character made with the writing instrument;

means for determining a set of possible subsequent characters;

means for comparing an actual subsequent character to the set of possible subsequent characters;

means for determining one of the set of possible subsequent characters that corresponds to the actual subsequent character; and means for adjusting the transformed data based on a difference between the actual subsequent character and the corresponding possible subsequent character.

* * * * *